United States Patent [19]

Nakamura et al.

[11] Patent Number: 4,499,136
[45] Date of Patent: Feb. 12, 1985

[54] ANTI-CORROSIVE COVERING SHEET

[75] Inventors: Yukio Nakamura; Tsuneo Tanaka, both of Ichihara, Japan

[73] Assignee: Ube Industries Ltd., Ube, Japan

[21] Appl. No.: 503,221

[22] Filed: Jun. 10, 1983

[30] Foreign Application Priority Data

Jun. 18, 1982 [JP] Japan .................................. 57-103741

[51] Int. Cl.$^3$ ........................ C23F 13/00; D03D 49/24
[52] U.S. Cl. .............................. 428/206; 138/DIG. 1; 138/DIG. 6; 174/DIG. 8; 427/372.2; 428/341; 428/344; 428/349
[58] Field of Search .................. 138/DIG. 1, DIG. 6; 174/DIG. 8; 428/148, 334, 206, 339, 341, 349, 344; 427/372.2; 156/542

[56] References Cited

U.S. PATENT DOCUMENTS

| | | | |
|---|---|---|---|
| 3,592,725 | 7/1971 | Yoshimura et al. | 428/148 |
| 3,718,495 | 2/1973 | Tomita | 174/DIG. 8 |
| 4,268,334 | 5/1981 | Harris et al. | 138/DIG. 1 |
| 4,287,034 | 9/1981 | Pieslak et al. | 174/DIG. 8 |

Primary Examiner—John E. Kittle
Attorney, Agent, or Firm—Frishauf, Holtz, Goodman & Woodward

[57] ABSTRACT

An anti-corrosive covering sheet for wrapping around a metal pipe such as a steel pipe comprising a heat-shrinkable plastic sheet, an adhesive layer and an anti-corrosive layer laminated in order, in which the adhesive layer comprises a hot-melt adhesive material having a melting temperature of not lower than 50° C. and containing 30–80% by weight of an adhesive olefin copolymer; and the anti-corrosive layer contains an anti-corrosive agent and has a thickness in the range of 1–10 micron.

20 Claims, No Drawings

ANTI-CORROSIVE COVERING SHEET

This invention relates to an anti-corrosive covering sheet and a process for the preparation of the same. More particularly, the invention relates to an anti-corrosive covering sheet for wrapping around a metal pipe, and a process for the prepration of the same.

A metal pipe such as a steel pipe coated with a plastic material layer, for instance, a coated steel pipe, is highly resistant to corrosion caused under corrosive surrounding conditions. For this reason, the coated metal pipe is employed in a wide variety of arts such as pipelines for supply of crude oil or natural gas, gas service pipes, and water service pipes. Particularly, the pipelines for the supply of crude oil or natural gas generally utilize the coated steel pipes, because such pipelines are generally installed under severe surrounding conditions.

The coated steel pipes are generally connected to each other through welding. Thus, the coated steel pipes are exposed on the connecting portion area, and accordingly requires provision of a wrapping material layer over the exposed area.

In general, a procedure for wrapping the exposed connecting portion area of the coated steel pipes with a plastic material layer is carried out as follows;

A heat-shrinkable plastic covering sheet (sheet comprising a heat-shrinkable plastic sheet, that is, heat-shrinkable plastic material sheet, and an adhesive layer provided thereon) is loosely wrapped around the exposed connecting portion area of the pipes. In this procedure, the position of the covering sheet is adjusted to be overlapped at both sides with the previously coated plastic covering layers of the pipe. Subsequently, a flame supplied from a gas burner is applied onto the surface of the covering sheet for a certain period to elevate the temperature of the sheet surface so as to initiate shrinking action of the sheet. After some or most of the sheet surface contacts the exposed surface of the pipe, the surface of the sheet is manually pressed and spread to be evenly placed on the exposed area of the pipe.

Under ordinary circumferential conditions, the connecting portion of the pipe is satisfactorily protected from corrosion by covering the portion with the above-mentioned conventional covering sheet comprising a heat-shrinkable plastic sheet and an adhesive layer provided thereon. However, if the steel pipes are employed as pipelines for transportation of crude oil or natural gas and installed under severely corrosive circumferential conditions, such pipes are poorly protected from corrosion by means of the conventional simple covering sheet.

The above-described problems also reside in the use of metal pipes other than steel pipe.

Accordingly, a primary object of the present invention is to provide a covering sheet employable for the coverage of the exposed portion area of a metal pipe such as a steel pipe or a pipe made of copper lead or metal alloy, which is applied as easily as the conventional covering sheet, but capable of providing the exposed portion area of the metal pipe with prominently enhanced corrosion resistance.

The present invention resides in an anti-corrosive covering sheet for wrapping around a metal pipe such as a steel pipe comprising a heat-shrinkable plastic sheet, an adhesive layer and an anti-corrosive layer laminated in order, in which the adhesive layer comprises a hot-melt adhesive material having a melting temperature of not lower than 50° C. and containing 30–80% by weight of an adhesive olefin copolymer; and the anti-corrosive layer contains an anti-corrosive agent and has a thickness in the range of 1–10 microns, preferably 1.5–7 microns.

The present invention is now described below in more detail.

The anti-corrosive covering sheet of the invention comprises a structure in which a heat-shrinkable plastic sheet, an adhesive layer and an anti-corrosive layer are laminated in this order, as stated above.

The heat-shrinkable plastic sheet of the invention can be any of various heat-shrinkable plastic material sheets known or proposed for the use in the conventional covering sheet. Examples of the plastic material include polyethylene, polypropylene, ethylene-propylene copolymer, ethylene-vinyl acetate copolymer, poly(vinyl chloride), polyester, and polyamide. Most preferred are polyethylene and ethylene-vinyl acetate copolymer. Also preferred is ethylene-propylene copolymer.

The plastic material sheet can be rendered heat-shrinkable by any of known procedures. The desired heat-shrinking property of the sheet can be easily provided and adjusted by appropriately setting and controlling the drawing conditions (stretching conditions) such as drawing temperature and draw ratio during or after the process of the preparation of a plastic sheet. The heat-shrinkable sheet is preferably cross-linked by applying irradiation or other means before or after being subjected to the stage for the provision of the heat-shrinking property whereby supplying the sheet with heat-resistance.

The adhesive layer provided to the covering sheet of the invention comprises a hot-melt adhesive material having a melting temperature of not lower than 50° C. and containing 30–80% by weight of an adhesive olefin copolymer. In other words, the adhesive material employed in the invention is a hot melt adhesive material containing an adhesive olefin copolymer as the main component, showing little plasticity at around room temperature and melting at a temperature of not lower than 50° C. The hot-melt adhesive material employed in the invention preferably shows adhesion to steel surface at a level of not less than 5 kg/cm (peel angle: 180°, peeling rate: 10 mm/min., at 20° C.).

The adhesive layer generally has a thickness in the range of 50–2500 micron, preferably in the range of 100–2000 micron.

If the adhesive layer of the invention is replaced with another adhesive layer made of materials which are liquid at around room temperature such as vegetable oil and animal oil (e.g. fish oil); tacky or adhesive oils such as synthetic drying oil, liquid alkyd resin, and liquid rubber; or tacky or adhesive solid materials showing noticeable plasticity at around room temperature such as wax (e.g. petrolatum, and vaseline), a covering sheet provided with such an adhesive layer other than that of the invention is able to show neither high adhesion property nor high anti-corrosive property, even though the same anti-corrosive layer as that of the invention is overlaid thereon. The reasons are thought to be as follows: First, the above-mentioned liquid or solid materials as such show no practically satisfactory adhesion. Second, when the covering sheet is applied onto a metal pipe such as a steel pipe, an anti-corrosive agent included in the anti-corrosive layer tends to begin to quickly escape therefrom into the adhesive layer under pressure and finally disappear from the anti-corrosive layer within a short period. These properties apparently reduce the effect expected by the provision of an anti-corrosive layer.

An adhesive material preferably employed in the invention is a hot-melt type adhesive composition melting at a temperature of not lower than 50° C., preferably not lower than 70° C., comprising 30–80% by weight of an adhesive olefin copolymer, 30–5% by weight of a (block) copolymer of an aromatic hydrocarbon having one or more vinyl groups and a conjugated diene compound, and 40–15% by weight of a resinous tackifier.

Examples of the adhesive olefin copolymer employable for the above purpose include etylene-alfa-olefin (such as propylene) copolymer, ethylene-vinyl acetate copolymer, ethylene-lower alkyl (such as methyl, ethyl, propyl, and butyl) acrylate copolymer, ethylene-lower alkyl (such as methyl ethyl, propyl, and butyl) methacrylate copolymer, ethylene-acrylic acid copolymer, ethylene-methacrylic acid copolymer, and maleic polyolefin. These copolymers can be employed alone or in combination.

Examples of the block copolymer of an aromatic hydrocarbon having one or more vinyl groups and a conjugated diene compound include styrene-butadiene-styrene (block) copolymer, and styrene-isoprene-styrene (block) copolymer. These copolymers likewise can be employed alone or in combination.

There is no specific limitation on the resinous tackifier employable in the invention, so far as it belongs to those employed conventionally for the preparation of adhesive compositions. Examples of the resinous tackifier include rosin and rosin derivatives such as glycerol ester of hydrogenated rosin; pinene resins such as pinene polymer derived mainly from beta-pinene, and alfa-pinene-phenol copolymer; hydrocarbon resins such as aliphatic hydrocarbon resin (homopolymer or copolymer of $C_5$ distillate, pentenes, isoprene, or 1,3-pentadiene), aromatic hydrocarbon resin (homopolymer or copolymer of $C_9$ distillate, styrenes, or indenes), copolymer of aliphatic hydrocarbon and aromatic hydrocarbon, alicyclic hydrocarbon resin, cumarone resin, and cumarone-indene resin; and other polymer materials and oily materials such as phenol resin, alkylphenol resin, naphthene oil, and modified terpene oil. These tackifiers likewise can be employed alone or in combination.

There is no specific limitation on a process for the provision of the adhesive layer onto the heat-shrinkable plastic sheet. For instance, an adhesive material is extruded on the plastic sheet to form the adhesive layer. Otherwise, a solution of an adhesive material in an organic solvent is coated over the plastic sheet and then dried to form the adhesive layer.

The anti-corrosive agent to be incorporated into the anti-corrosive layer can be selected from known anti-corrosive agents for prevention of corrosion of metals such as iron or steel material. The anti-corrosive agent can be an inorganic or organic compound. Examples of the inorganic anti-corrosive agent include metal salts of chromic acid (chromates) such as sodium chromate, potassium chromate, zinc chromate, magnesium chromate and chromium chromate; metal salts of phosphoric acid (phosphates) such as sodium dihydrogen phosphate, potassium dihydrogen phosphate, trisodium phosphate, tripotassium phosphate, magnesium hydrogen phosphate, and zinc phosphate; borates such as sodium borate, and potassium borate; nitrites such as sodium nitrite and potassium nitrite; and molybdates such as sodium molybdate. Examples of the organic anti-corrosive agent include metal acids of aromatic acids such as sodium benzoate; polyhydroxyl compounds such as glucose, pentaerythritol, mannitol, sorbitol, and polyvinyl alcohol; and organic acids such as tannic acid. Of these anti-corrosive agents, chromates and phosphates are preferably effective in the present invention.

The anti-corrosive agent employed in the present invention is preferably in a particulate solid form.

The anti-corrosive layer provided onto the adhesive layer of the anti-corrosive covering sheet of the present invention comprises an anti-corrosive agent and an adhesive material. The anti-corrosive agent is contained in the layer under such conditions that solid particles of the anti-corrosive agent are exposed at a relatively high concentration (density) over the outer surface (surface not facing the adhesive layer). The adhesive material for the anti-corrosive layer is preferably selected from those described with respect to the adhesive layer.

The thickness of the anti-corrosive layer is necessarily in the range of 1–10 micron. If the thickness of the anti-corrosive layer exceeds 10 micron, the adhesive layer hardly is in contact with the surface of the metal pipe, resulting in poor adhesion between the covering sheet and the pipe surface. Accordingly, the surface of the metal pipe is likely exposed to outer atmosphere, humid air or the like, and no satisfactory anti-corrosive effect of the covering sheet is expected. Enough anti-corrosive effect is likewise not expected, if the anti-corrosive layer has a thickness of less than 1 micron. The reason is that such a thin anti-corrosive layer hardly carrys an anti-corrosive agent in an amount enough for providing satisfactory corrosion resistance. The thickness of the anti-corrosive layer preferably is in the range of 1.5–7 micron.

The anti-corrosive agent is preferably contained in the anti-corrosive layer in an amount of approximately 0.01–1 mg/cm$^2$, preferably approx. 0.05–0.5 mg/cm$^2$, based on the surface area of the anti-corrosive layer.

There is no specific limitation on a process for the provision of the anti-corrosive layer onto the adhesive layer. For instance, a dispersion or solution containing an anti-corrosive agent is coated over the surface of the adhesive layer and then dried. Otherwise, powdery anti-corrosive agent as such or in the form of a solution or dispersion is dusted or sprayed over the surface of the adhesive layer, and then dried if necessary.

For the preparation of an anti-corrosive covering sheet for wrapping around a metal pipe of the invention, it is preferred to employ one of two processes described below.

One process comprises forming a layer of a dispersion or solution containing an anti-corrosive agent on a surface of an adhesive layer provided on a heat-shrinkable plastic sheet; and drying the dispersion or solution layer to prepare an anti-corrosive layer having a thickness in the range of 1–10 micron.

Another process comprises forming a layer of a dispersion or solution containing an anti-corrosive agent on a surface of an adhesive film (or sheet) which comprises the hot-melt adhesive material; drying the dispersion or solution layer to prepare an anti-corrosive layer having a thickness in the range of 1–10 micron; and providing a heat-shrinkable plastic sheet onto the free surface of the adhesive film having the anti-corrosive layer.

In either of these processes, the procedure for drying the anti-corrosive layer is preferably carried out at a temperature lower than the melting temperature of the adhesive material incorporated into the adhesive layer (or adhesive film) so that the anti-corrosive agent does not penetrate excessively into the adhesive layer.

The anti-corrosive covering sheet of the present invention, some embodiments of which are given here, can be readily provided around an exposed surface portion of a metal pipe in a similar manner to that employed for the known covering sheet, and moreover imparts to the exposed surface portion of the metal pipe a prominently enhanced anti-corrosive property as compared with the known covering sheet does.

Since the anti-corrosive covering sheet of the present invention shows such a prominent anti-corrosive property when placed around the exposed surface portion of a metal pipe, said covering sheet can be advantageously employed particularly for the anti-corrosive protection of a steel pipe installed under severe conditions, such as pipelines for transportation of crude oil and natural gas. In these employments, the anti-corrosive covering sheet of the invention protects these steel or other pipes from corrosion for a long period of time.

The present invention is further illustrated by the following examples. Comparison examples are also given. In the examples, "part" means "part by weight", unless otherwise indicated.

EXAMPLE 1

The adhesive composition set forth below was extruded on a heat-shrinkable cross-linked polyethylene sheet (width: 19 mm, length: 100 mm, thickness: 2 mm) to form an adhesive film layer (thickness: 1.5 mm).

| Adhesive Composition | |
|---|---|
| Ethylene-propylene copolymer elastomer (MI: 3.2 g/10 min., density: 0.88 g/cm$^3$) | 17 parts |
| Ethylene-vinyl acetate copolymer (Melting point: 94° C., softening point: 78° C., | 20 parts |
| Styrene-butadiene-styrene block copolymer (Density: 0.94 g/cm$^3$) | 17 parts |
| Cumarone resin (Softening point: 93° C.) | |
| Terpene-phenol copolymer (Softening point: 100° C.) | 20 parts |
| Hydrogenated rosin ester (Softening point: not lower than 68° C.) | 9 parts |

Melting temperature of the so obtained adhesive composition was 135°–140° C.

On the surface of the adhesive layer was coated an anti-corrosive agent dispersion of 5% by weight of powdery zinc chromate (anti-corrosive agent) in a mixture of water and ethanol. The coated layer was then dried with a dryer to provide an anti-corrosive layer consisting of the anti-corrosive agent dispersed in the adhesive composition and having a thickness of approximately 5 micron. The anti-corrosive agent was contained in the anti-corrosive layer in an amount of 0.1 mg/cm$^2$ based on the surface area of the layer.

The so obtained sample strip of a covering sheet was adhered onto a steel strip (width: 19 mm, length: 100 mm, thickness: 2 mm) by means of a hot plate in such a manner that a portion of the covering sheet strip was protruded beyond the edge of the steel strip along the longitudinal direction. The conditions of the adhering procedure was as follows:
Pre-heating temperature: 120° C.
Pre-heating period: 5 min.
Load: 5 g/cm$^2$
loading period: 5 min. (under heating)

The so prepared adhered sample was evaluated for preliminary for adhesion as well as adhesion after immersion (immersion in water at 80° C. for 500 hours) in the manner given below:
Method for the measurement of adhesion: peel angle 180°, peeling rate: 10 mm/min., at 20° C.

The results are given below:
Preliminary adhesion: 7.7 kg/cm
Adhesion after immersion: 6.5 kg/cm The above results clearly indicate that the steel surface closely covered with the covering sheet strip of this example showed little corrosion even after contact with hot water for a long period.

EXAMPLE 2

A covering sheet sample strip was prepared in the same manner as in Example 1 except that zinc phosphate was employed as the anti-corrosive agent.

The covering sheet strip was then adhered onto the steel strip and evaluated for preliminary adhesion and for adhesion after immersion in the same manner as in Example 1.

The results are given below:
Preliminary adhesion: 7.4 kg/cm
Adhesion after immersion: 4.7 kg/cm The above results clearly indicate that the steel surface closely covered with the covering sheet strip of this example showed little corrosion even after contact with hot water for a long period.

EXAMPLE 3

A covering sheet sample strip was prepared in the same manner as in Example 1 except that glucose was employed as the anti-corrosive agent.

The covering sheet strip was then adhered onto the steel strip and evaluated for preliminary adhesion and for adhesion after immersion in the same manner as in Example 1.

The results are given below:
Preliminary adhesion: 6.9 kg/cm
Adhesion after immersion: 3.2 kg/cm The above results indicate that the steel surface closely covered with the covering sheet strip of this example showed little corrosion after contact with hot water for a long period, even though the resistance to corrosion was relatively low as compared with those given in Examples 1 and 2.

COMPARISON EXAMPLE 1

A covering sheet sample strip was prepared in the same manner as in Example 1 except that the anti-corrosive layer was not provided.

The covering sheet strip was then adhered onto the steel strip and evaluated for preliminary adhesion and for adhesion after immersion in the same manner as in Example 1.

The results are given below:
Preliminary adhesion: 8.2 kg/cm
Adhesion after immersion: 0.5 kg/cm The above results indicate that the steel surface closely covered with the covering sheet strip of this example showed high corrosion after contact with hot water for a long period, and accordingly reduced the adhesion noticeabley.

COMPARISON EXAMPLE 2

A covering sheet sample strip was prepared in the same manner as in Example 1 except that the anti-corrosive layer was not provided, but the anti-corrosive agent (zinc chromate) was incorporated into the adhesive film in the amount of 5% by weight based on the amount of the film. The incorporation of the anti-corrosive agent into the adhesive film was carried out through kneading the materials in Brabender Plastograph at 140° C., 5 min., and 50 r.p.m.

The covering sheet strip was then adhered onto the steel strip and evaluated for preliminary adhesion and for adhesion after immersion in the same manner as in Example 1.

The results are given below:
Preliminary adhesion: 7.1 kg/cm
Adhesion after immersion: 0.7 kg/cm The above results indicate that the steel surface closely covered with the covering sheet strip of this example showed high corrosion after contact with hot water for a long period, and accordingly reduced the adhesion noticeably.

COMPARISON EXAMPLE 3

A covering sheet sample strip was prepared in the same manner as in Example 1 except that the anti-corrosive layer was not provided, but the anti-cossosive agent (zinc chromate) was incorporated into the adhesive film in an amount of 20% by weight based on the amount of the film. The incorporation of the anti-corrosive agent into the adhesive film was carried out under the same conditions as in Comparison Example 2.

The covering sheet strip was then adhered onto the steel strip and evaluated for preliminary adhesion and for adhesion after immersion in the same manner as in Example 1.

The results are given below:
Preliminary adhesion: 1.5 kg/cm
Adhesion after immersion: 0.8 kg/cm The above results indicate that the steel surface closely covered with the covering sheet strip of this example showed very poor preliminary adhesion. This is thought to result from reduction of the agglomerating property of the adhesive material due to incorporation of a great amount of the anti-corrosive agent into the adhesive layer.

Examples 1 through 3 as well as Comparison Examples 1 through 3 were repeated using a steel pipe in place of the steel strip, and it was confirmed that similar results were obtained.

We claim:

1. An anti-corrosive covering sheet for wrapping aroung a metal pipe comprising a three layer laminate consisting essentially of an outer heat-shrinkagle plastic sheet, an intermediate adhesive layer and an outer anti-corrosive layer
said adhesive layer comprising a hot-melt adhesive material having a melting temperature of not lower than 50° C. and containing 30-80% by weight of an adhesive olefin copolymer; and
said anti-corrosive layer has a thickness in the range of 1-10 microns, and contains an anti-corrosive agent selected from the group consisting of organic anti-corrosive agents and inorganic anti-corrosive agents dispersed in the same hot-melt adhesive material which comprises said adhesive layer in an amount of 0.01-1 mg/cm$^2$.

2. The anti-corrosive covering sheet as claimed in claim 1, in which a thickness of the anti-corrosive layer ranges from 1.5 to 7 microns.

3. The anti-corrosive covering sheet as claimed in claim 1, in which the anti-corrosive agent is in particulate solid form.

4. The anti-corrosive covering sheet as claimed in claim 3, in which the anti-corrosive agent is selected from the group consisting of a metal salt of chromic acid, a metal salt of phosphoric acid, and a mixture thereof.

5. The anti-corrosive covering sheet as claimed in claim 2, in which the anti-corrosive agent is in a particulate solid form.

6. The anti-corrosive covering sheet as claimed in claim 5, in which the anti-corrosive agent is selected from the group consisting of a metal salt of chromic acid, a metal salt of phosphoric acid, and a mixture thereof.

7. The anti-corrosive covering sheet as claimed in claim 5, in which the anti-corrosive agent is a metal chromate and is present in said anti-corrosive layer in an amount of 0.05-0.5 mg/cm$^2$.

8. The anti-corrosive covering sheet as claimed in claim 7, in which the anti-corrosive agent is zinc chromate.

9. The anti-corrosive covering sheet as claimed in claim 8, wherein said hot-melt adhesive layer comprises ethylene-propylene copolymer elastomer and ethylene-vinyl acetate copolymer.

10. The anti-corrosive covering sheet as claimed in claim 9, in which said hot-melt adhesive material further comprises styrene-butydiene-styrene block copolymer, cumarone resin, terpene-phenol copolymer and hydrogenated rosin ester.

11. The anti-corrosive covering sheet as claimed in claim 5, in which the anti-corrosive agent is a metal phosphate and is present in said anti-corrosive layer in an amount of 0.05-0.5 mg/cm$^2$.

12. The anti-corrosive covering sheet as claimed in claim 7, in which the anti-corrosive agent is zinc phosphate.

13. The anti-corrosive covering sheet as claimed in claim 12, wherein said hot-melt adhesive layer comprises ethylene-propylene copolymer elastomer and ethylene-vinyl acetate copolymer.

14. The anti-corrosive covering sheet as claimed in claim 13, in which said hot-melt adhesive material further comprises styrene-butydiene-styrene block copolymer, cumarone resin, terpene-phenol copolymer and hydrogenated rosin ester.

15. The anti-corrosive covering sheet as claimed in claim 2, wherein said hot-melt adhesive layer comprises ethylene-propylene copolymer elastomer and ethylene-vinyl acetate copolymer.

16. The anti-corrosive covering sheet as claimed in claim 15, in which said hot-melt adhesive material further comprises styrene-butydiene-styrene block copolymer, cumarone resin, terpene-phenol copolymer and hydrogenated rosin ester.

17. The anti-corrosive covering sheet as claimed in claim 8, wherein said hot-melt adhesive composition comprises 17 parts of ethylene-propylene copolymer elastomer, 20 parts of ethylene-vinyl acetate copolymer, 17 parts of styrene-butydiene-styrene block copolymer, 17 parts of cumarone resin, 20 parts of terpene-phenol copolymer and 9 parts of hydrogenated rosin ester.

18. The anti-corrosive covering sheet as claimed in claim 12, wherein said hot-melt adhesive composition comprises 17 parts of ethylene-propylene copolymer elastomer, 20 parts of ethylene-vinyl acetate copolymer, 17 parts of styrene-butydiene-styrene block copolymer, 17 parts of cumarone resin, 20 parts of terpene-phenol copolymer and 9 parts of hydrogenated rosin ester.

19. A process for the preparation of an anti-corrosive covering sheet for wrapping aground a metal pipe comprising a three layer laminate consisting essentially of an outer heat-shrinkable palstic sheet, an intermediate adhesive layer and an outer anti-corrosive layer,
which comprises:
forming a layer of a dispersion or solution containing an anti-corrosive agent selected from the group consisting of organic anti-corrosive agents and inorganic anti-corrosive agents on the surface of an adhesive layer coating a heat-shrinkable plastic sheet, in which the adhesive layer comprises a hot-melt adhesive material having a melting temperature of not lower than 50° C. and containing 30–80% by weight of an adhesive olefin copolymer; and
drying the dispersion or solution layer to prepare an anti-corrosive layer having a thickness in the range of 1–10 microns.

20. A process for the preparation of an anti-corrosive covering sheet for wrapping around a metal pipe comprising a three layer laminate consisting essentially of an outer heat-shrinkable plastic sheet, and intermediate adhesive layer and an outer anti-corrosive layer,
which comprises:
forming a layer of a dispersion or solution containing an anti-corrosive agent selected from the group consisting of organic anti-corrosive agents and inorganic anti-corrosive agents on a first surface of an adhesive film which comprises a hot-melt adhesive material having a melting temperature of not lower than 50° C. and containing 30–80% of weight of an adhesive olefin copolymer;
drying the dispersion or solution layer to prepare an anti-corrosive layer having a thickness in the range of 1–10 microns; and
laminating a heat-shrinkable plastic sheet onto the second surface of the adhesive film having the anti-corrosive layer on said first surface thereof.

* * * * *